Jan. 23, 1962 J. H. ANDRESEN, JR 3,018,429
CONSTANT SPEED MOTOR SYSTEM
Filed April 6, 1959 2 Sheets-Sheet 2
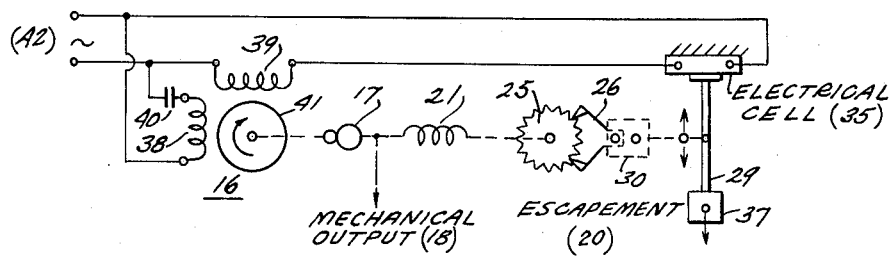
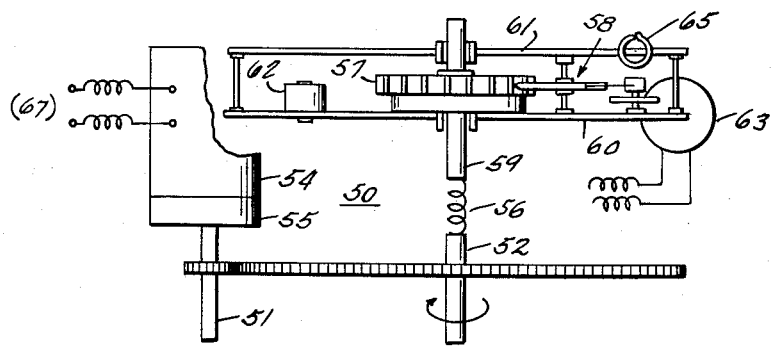
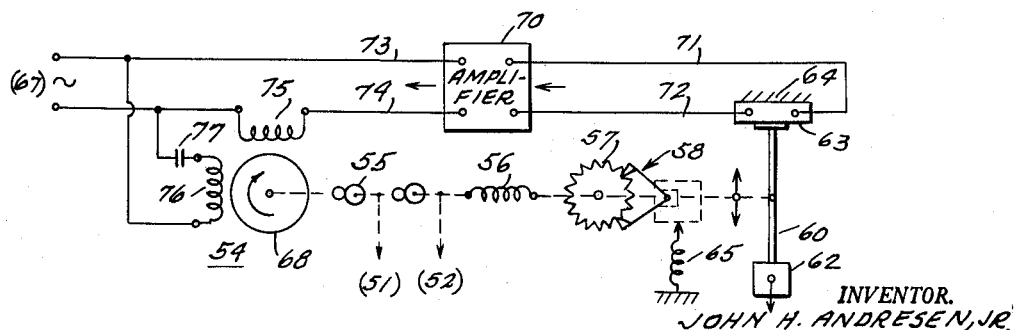
INVENTOR.
JOHN H. ANDRESEN, JR.

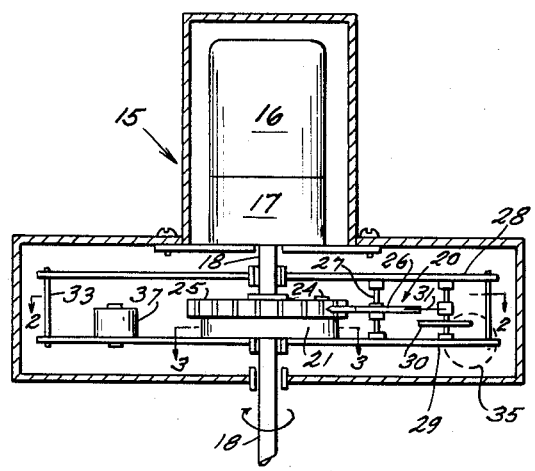

United States Patent Office 3,018,429
Patented Jan. 23, 1962

3,018,429
CONSTANT SPEED MOTOR SYSTEM
John H. Andresen, Jr., Greenwood Lake, N.Y., assignor to Kollsman Instrument Corporation, Elmhurst, N.Y., a corporation of New York
Filed Apr. 6, 1959, Ser. No. 804,318
11 Claims. (Cl. 318—312)

This invention relates generally to constant speed motors, and more particularly to novel electromechanical speed stabilizing means with a non-synchronous motor.

In accordance with the invention hereof, a time-based escapement is coupled to the output shaft of an electrical motor. A resistance cell is placed in circuit with the motor to vary its speed and/or torque output in accordance with pressure applied to the cell. When the motor speed tends to change from the predetermined escapement rate, there is transmitted to the cell a corresponding pressure change oriented to vary its resistance to return the motor speed to the normal. The motor may for example be a split-phase A.C. induction motor, with one winding in series with the cell; or a D.C. motor with its field winding in circuit with such cell.

In a preferred form of the invention the plate upon which the escapement is mounted is arranged to press against one wall of the electrical cell. Also a spiral spring is used to couple the motor output with the escapement ratchet. The motor thus drives the escapement through this spring. This prevents any sudden, destructive load being applied to the escapement. Motor slip is not a factor in the operation. A preferred cell has its resistance reduced with increase of mechanical pressure thereon.

The output shaft of the invention motor can be constructed with any usual speed or torque. For larger motor powers an amplifier is interposed between the resistance cell and the motor control winding. There are many practical applications of a constant speed motor constructed in accordance with the present invention. These include chart drive, time standard, time base for integrator, a continuous clock with highly frictional indication such as a Veeder counter, etc.

It is accordingly a primary object of the present invention to provide a novel constant speed electric motor drive.

Another object of the present invention is to provide a novel motor-escapement combination with an electrical resistance cell arranged to maintain speed constancy.

A further object of the present invention is to provide a novel constant speed motor system incorporating a time-based escapement mechanism coupled to the motor output through a stabilizing spring.

Still another object of the present invention is to provide a novel constant speed motor incorporating an escapement device controllably pressing a resistance cell in circuit with a winding of the motor.

Still a further object of the present invention is to provide a novel split-phase A.C. induction motor having one winding in series with a resistance cell the pressure of which is altered to effect a control action to maintain the motor speed substantially constant.

These and further objects of this invention will become more apparent from the following description of exemplary embodiments thereof, taken in connection with the drawings, in which:

FIGURE 1 is a plan view of the constant speed motor system within its housing, in section, constituting an exemplary form of the invention.

FIGURE 2 is a cross-sectional view through the escapement mechanism of the system of FIGURE 1 as taken along the line 2—2 thereof.

FIGURE 3 is a cross-sectional view taken along the line 3—3 of FIGURE 1 through the spiral coupling spring.

FIGURE 4 is a schematic diagram of the constant speed motor system of FIGURES 1, 2 and 3.

FIGURE 5 is a diagrammatic showing of another form of the invention system.

FIGURE 6 is a schematic diagram of the constant speed motor system of FIGURE 5.

The constant speed motor system 15 shown in FIGURE 1 comprises a basic electric motor 16 with a directly coupled reduction gear-box 17 having an output shaft 18. A time-base escapement mechanism 20 is coupled to the output shaft 18 through spiral tongue spring 21. This is effected by the interior end 22 of spring 21 being attached to shaft 18, as seen in FIGURE 3; and the outer end 23, to a post 24 set in ratchet-gear 25, seen in FIGURE 2.

The ratchet 25 is rotatably mounted about shaft 18, and is free to coact with the oscillated escapement member 26. Escapement member 26 is pivoted by its stem 27, which in turn is supported in bearings between plates 28, 29. The balance-wheel 30 has an extending pin 31 controlling the rate of oscillation of escapement member 26 in a connectional manner. The stem 32 of balance wheel 30 is pivoted in bearings between the plates 28, 29.

The parallel plates 28, 29 support the timed control mechanism including the spring 21 and the escapement mechanism 20, 25. Plates 28, 29 are free from shaft 18, being rotatable with respect thereto. Several pins 33, 33 interconnect plates 29, 28 in fixed relation. The escapement mechanism 20 thus is physically secured with plates 28, 29 in that they to a small extent motivate together about shaft 18, as will be set forth hereinafter.

The motor 16 drives the escapement 20 through torque spring 21. Spring 21 is preferably flat, of the type used as clock winding springs. It serves as a protective element to prevent any destructive or sudden forces from the motor being transmitted to the escapement 20. The escapement 20 is timed by the predetermined setting or design of the balance wheel 30 as in conventional clock motors. An adjustment lever (not shown) may be used to vary the timing by the balance wheel 30. The shaft 18 output speed is controlled by the balance wheel-escapement timing, in a manner now to be described.

When the motor 16 tries to turn shaft 18 faster than the predetermined speed, the torque spring 21 is thereby wound up to apply more torque on escapement gear 25. This action causes the plate assembly 28, 29 to be displaced with respect to a resistance cell 35, namely to change its pressure thereupon. As seen in FIGURES 1 and 2, an edge of plate 29 is juxtaposed with cell 35. Cell 35 is fixedly mounted on a frame portion 36 of the system 15.

Cell 35 is a pressure-resistance type unit which has its resistance change in accordance with changes in mechanical pressure applied between its two faces. In the exemplary embodiment a "celob" cell was used, manufactured by the Clarke Electronic Laboratories. It is of semi-conductor material which has reduced resistance with increased mechanical pressure applied. Other resistance pressure cells may, of course, be used herein. A weight 37 is secured to plate 29, diagonally opposite to the cell location to statically counterbalance the plate assembly 28, 29 for gravity load "g," or position.

FIGURE 4 is a schematic diagram of the motor system 15, showing the electrical interconnections thereof. The motor 16 has two windings 38, 39 in quadrature, with a condenser 40 in series with winding 38. The rotor 41 connects to reduction gearing 17 which in turn is coupled to torque spring 21 and mechanical output 18. Winding 39 is connected in series with resistance cell 35.

Both windings 38, 39 are connected across the alternating current source 42, which may be at 400 cycles.

The motor torque normally presses plate 29 against cell 35. When the motor speed tends to be greater than the pre-set speed determined by the escapement rate of ratchet 25, plate 29 exerts less pressure against cell 35, in the system 15 arrangement. A slight angular displacement of plate assembly 28, 29 is thus converted into a pressure change on cell 35. In this case, the decrease in pressure increases the cell resistance, which in turn reduces the current in motor winding 39, and correspondingly reduces the motor torque to keep its speed at the predetermined rate.

Conversely, should the motor output speed, at shaft 18, tend to decrease, the plate 29 is thereupon pressed harder upon cell 35. This increased pressure decreases the resistance of cell 35 in the motor winding 39 circuit. More current thereupon flows in winding 39 to increase the torque of rotor 41 and maintain shaft 18 at the predetermined rate.

The output speed at shaft 18 of the motor system 15 is practically uniform. The motor 16 is controlled by the average resistance of cell 35. The cell 35 resistance is slightly effected by the escapement ticks. Possible speed bumps, however, are opposed by the rotor 41 inertia. Also, the torque spring absorbs the intermittency of the escapement action. The motor 16 is designed to be capable of faster speed than the escapement 20, so that it can be controlled by increased cell 35 resistance.

FIGURES 5 and 6 illustrate a modified version of the invention system. The constant speed system 50 has two mechanical output shafts 51, 52 mutually geared at 53. The electrical motor 54 is coupled thereto by reduction gearing 55. The torque spring 56 couples shaft 52 to the ratchet gear 57 of the escapement mechanism 58, as in motor system 15, through the schematically shown post 59. The parallel plate assembly 60, 61 carries the escapement mechanism 58, as heretofore, and a counterbalancing weight 62 which is optional.

The pressure resistance cell 63 coacts with plate 60, and is fixedly mounted in a frame portion 64. A biasing spring 65 is arranged to press against plate 61 in a manner to preload the cell 63 to a low resistance value. Biasing spring 65 in anchored in a frame portion (66). A tendency for the motor to speed up increases torque on the escapement 57, 58. This causes plate 61 to oppose the bias spring 65 and relieve pressure correspondingly on cell 63. The increased cell resistance results in torque decrease and speed maintenance.

When a load is placed on output shafts 51, 52, or the supply voltage at source 67 lowers, the rotor 68 slows down momentarily. However, as the escapement 58 continues uniformly, the torque spring 56 unwinds an amount corresponding to part of a turn of output shafts 51, 52. This reduces the opposing torque on cell 63 and biasing spring 65 presses against cell 63 harder, decreasing its resistance. The decreased cell 63 resistance provides extra motor torque to carry increased load at the escapement speed, or makes up for drop in voltage supply 67.

An amplifier 70 has its input connected to cell 63 by leads 71, 72, and its output in series with split-phase motor winding 75 by leads 73, 74. Motor winding 76, in quadrature with winding 75, has a series capacitor 77. The amplifier 70 is arranged to be responsive to resistance changes of cell 63, and in turn to change the current through winding 75 inversely for the control action.

The output power change is limited by the change in power effected in control winding 75. Hence the motor system 15, controlled solely by cell 35 (FIG. 4), is limited in power output ratings at shaft 18. This is satisfactory for clocks, time standards, etc. For greater motor power output ratings and control action, the interposed amplifier 70 is used. In this way, the maximum and minimum torque values which the escapement can withstand, and still keep time, are not exceeded.

A wide range of applications of the invention motor system is feasible, including choice speed, torque, power rating. While a split phase induction motor was illustrated, it is understood that other motor types are usable, including direct current motors. The electrical cell or its associated amplifier is used to control current through a control or field winding of the motor, in a manner now understood by those skilled in the art.

Although the present invention was described with the exemplary embodiments hereof, it is to be understood that modifications may be made within the broader spirit and scope of the invention, as defined in the following claims.

I claim:

1. A constant speed motor system of the character described, comprising an electric motor with a winding connectible to a power source, an output shaft driven by said motor, a time-based escapement mechanism having an escapement wheel rotatable at a predetermined rate, means coupling said escapement wheel with said output shaft including a torque spring, a support for said mechanism, and a pressure variable impedance element in circuit relation with said winding, said support rotatably mounted to said output shaft, said support constructed and operatively positioned to engage said element and thereby exert a pressure on said element in accordance with speed differentials between said escapement wheel and said output shaft to correspondingly change current through said motor winding and maintain the output shaft speed.

2. A constant speed motor system of the character described, comprising an electric motor with a winding connectible to a power source, an output shaft driven by said motor, a time-based escapement mechanism having an escapement wheel rotatable at a predetermined rate, means coupling said escapement wheel with said output shaft, a support plate for said escapement wheel rotatably mounted about said shaft, and a pressure-responsive variable resistance element operatively positioned with respect to said plate and in circuit with said winding, said element being engaged by said plate to correspondingly change the current and maintain the output shaft speed substantially constant.

3. A constant speed motor system of the character described, comprising an electric motor with a winding connectible to a power source, an output shaft driven by said motor, a time-based escapement mechanism having an escapement wheel rotatable at a predetermined rate, means coupling said escapement wheel with said output shaft including a spiral torque spring, a support plate for said escapement wheel and said spring rotatably mounted about said shaft, and a pressure-responsive variable impedance element operatively positioned with respect to said plate and in series circuit with said winding, said element being engaged by said plate in accordance with speed differentials between said escapement wheel and said output shaft to correspondingly change the current through said motor winding and maintain the output shaft speed substantially constant at the escapement wheel rate.

4. A constant speed motor system as claimed in claim 1, further including a counterweight secured to said support to statically balance said mechanism.

5. A constant speed motor system as claimed in claim 3, further including a counterweight secured to said support plate to statically balance said mechanism.

6. A constant speed motor system as claimed in claim 5, further including a biasing spring arranged with said support plate to preload the element to a relatively low resistance value at predetermined shaft speed condition.

7. A constant speed motor system as claimed in claim 2, further including a biasing spring arranged with said support plate to preload the element to a relatively low resistance value at predetermined shaft speed condition.

8. A constant speed motor system as claimed in claim 3, in which the impedance element is a resistance that decreases in value upon pressure increase thereon.

9. A constant speed motor system as claimed in claim 8, further including a biasing spring arranged with said support plate to preload the element to a relatively low resistance value at predetermined shaft speed condition.

10. A constant speed motor system as claimed in claim 9, further including an amplifier connected between said element and said motor winding to substantially increase the speed control effect powerwise upon the motor.

11. A constant speed motor system as claimed in claim 2, further including an amplifier connected between said element and said motor winding to substantially increase the speed control effect powerwise upon the motor.

References Cited in the file of this patent

UNITED STATES PATENTS

| 1,577,618 | Ford | Mar. 23, 1926 |
| 2,685,440 | Tanner | Sept. 25, 1928 |
| 2,399,574 | Russell | Apr. 30, 1946 |

FOREIGN PATENTS

| 613,741 | Germany | May 24, 1935 |